United States Patent
Wesson et al.

(10) Patent No.: US 10,143,045 B2
(45) Date of Patent: Nov. 27, 2018

(54) RADIO FREQUENCY HEATING APPARATUS

(71) Applicant: Ampleon Netherlands, B.V., Nijmegen (NL)

(72) Inventors: Robin Wesson, Nijmegen (NL); Roger Williams, Barrington, RI (US)

(73) Assignee: Ampleon Netherlands, B.V., Nijmegen (NL)

( * ) Notice: Subject to any disclaimer, the term of this patent is extended or adjusted under 35 U.S.C. 154(b) by 553 days.

(21) Appl. No.: 14/715,473

(22) Filed: May 18, 2015

(65) Prior Publication Data

US 2015/0351164 A1    Dec. 3, 2015

(30) Foreign Application Priority Data

Jun. 3, 2014  (EP) .................................... 14170871

(51) Int. Cl.
| | |
|---|---|
| *H05B 6/68* | (2006.01) |
| *H05B 6/72* | (2006.01) |
| *H05B 6/64* | (2006.01) |
| *G01N 22/00* | (2006.01) |
| *H05B 6/70* | (2006.01) |

(52) U.S. Cl.
CPC .......... *H05B 6/686* (2013.01); *H05B 6/6402* (2013.01); *H05B 6/705* (2013.01); *H05B 6/72* (2013.01); *Y02B 40/143* (2013.01)

(58) Field of Classification Search
CPC .......... H05B 6/686; H05B 6/72; H05B 6/705; H05B 6/6402; Y02B 40/143
USPC ....... 219/702, 745, 746, 748, 750, 756, 678, 219/679, 690, 695, 696, 686; 324/637
See application file for complete search history.

(56) References Cited

U.S. PATENT DOCUMENTS

| | | | |
|---|---|---|---|
| 3,953,702 | A | 4/1976 | Bickel |
| 4,504,718 | A | 3/1985 | Okatsuka et al. |
| 5,081,425 | A | 1/1992 | Jackson et al. |

(Continued)

FOREIGN PATENT DOCUMENTS

| | | |
|---|---|---|
| CN | 103152889 | 6/2013 |
| EP | 2 182 774 A1 | 5/2010 |

(Continued)

OTHER PUBLICATIONS

Extended European Search Report for counterpart application EP 14170871.9 (dated Nov. 27, 2014).

*Primary Examiner* — Quang Van

(57) ABSTRACT

A radio frequency (RF) heating apparatus and a microwave oven including an RF heating apparatus. The apparatus includes a cavity for receiving an object to be heated. The apparatus also includes a plurality of channels for generating RF radiation to be introduced into the cavity. Each channel includes a frequency synthesizer, a power amplifier and an antenna. Each channel is operable to use a common phase reference signal for generating the RF radiation. Each channel may be controllably operable to generate RF radiation having different, respective frequency spectra. Forward and reverse signal detection circuitry may be provided that is operable to determine amplitude, frequency and/or phase information relating to RF radiation in the cavity. This information may be used for adaptively controlling the RF radiation generated by each channel.

11 Claims, 7 Drawing Sheets

(56) References Cited

U.S. PATENT DOCUMENTS

| | | |
|---|---|---|
| 2004/0206755 A1 | 10/2004 | Hadinger |
| 2012/0152938 A1* | 6/2012 | Nordh .................... H05B 6/705 |
| | | 219/702 |
| 2012/0152939 A1 | 6/2012 | Nobue et al. |

FOREIGN PATENT DOCUMENTS

| | | |
|---|---|---|
| EP | 2 205 043 A1 | 7/2010 |
| EP | 2 434 837 A1 | 3/2012 |
| EP | 2 549 832 A1 | 1/2013 |
| EP | 2 861 040 A1 | 4/2015 |
| JP | 2009/272273 A | 11/2009 |
| WO | 01/52604 A1 | 7/2001 |
| WO | 2009/020530 | 2/2009 |
| WO | 2013/183200 A1 | 12/2013 |

\* cited by examiner

RADIO FREQUENCY HEATING APPARATUS

CROSS-REFERENCE TO RELATED APPLICATIONS

This application claims the priority under 35 U.S.C. § 119 of European patent application no. 14170871.9, filed on Jun. 3, 2014, the contents of which are incorporated by reference herein.

FIELD OF THE INVENTION

This invention relates to a radio frequency (RF) heating apparatus. This invention also relates to a microwave oven comprising an RF heating apparatus.

BACKGROUND OF THE INVENTION

Conventional radio frequency (RF) heating devices, such as domestic or industrial microwave ovens, use a magnetron to generate RF radiation. Typically, these devices produce radiation at a single frequency or pseudo-randomly within a specific frequency band. These devices are also bulky and are limited with respect to the degree of controllability they provide over the radiation that is introduced into the cavity in which an object is to be heated (e.g. food).

More recently, devices which generate RF radiation using solid state semiconductor components have been proposed. Some conventional devices use a power divider architecture that employ multiple paths of a phase coherent signal for amplification and delivery to a cavity (e.g. see EP 2,182,774 A1 and EP 2,205,043 A1).

Although conceptually simple, these implementations have several drawbacks. For example, the power divider architecture forces all antennae in the device to provide power to the cavity at the same frequency, which may or may not be desired.

Also, in a system having multiple antennae, the antenna locations will tend to be dominated by the physics of the heating cavity. Ideal placement of the antennae, determined by the physics of the cavity, may require relatively long RF distribution paths. Longer distribution paths at the RF frequency create greater losses and may also inhibit phase alignment between the antennae. Because of these issues, the power divider architecture may place unwanted restrictions upon the design of the device.

Some conventional devices seek to adjust the generation of radiation introduced into the cavity of a heating device based on a reflected signal. For example, EP 2,205,043 A1 describes a microwave heating apparatus capable of heating an object by reducing the reflected power generated based on the object to be heated having the different configuration, kind, size, and amount, by arranging a first feeding part in the wall surface of the heating chamber, and arranging a second feeding part to radiate the reflected power received by the first feeding part to the heating chamber again, serving as the plurality of microwave supplying means each having a function to radiate the microwave.

In another example, EP 2,434,837 A1 describes a microwave heating device and microwave heating method in which damage of a microwave generating part by reflected power may be prevented by a control part, which receives a reflected power signal and a supply power signal from a power detecting part. The control part executes a frequency sweep operation of a prescribed frequency band with frequency sweep power lower than rated supply power supplied to a power feeding part during a heating operation, to thereby set an oscillation frequency at which the minimum reflected power becomes minimum, and to control an oscillation frequency of an oscillator part and an output of a power amplifier part.

EP 2,549,832 A1 describes a microwave heating apparatus. U.S. Pat. No. 5,081,425 describes a voltage standing wave ratio (VSWR) adaptive power amplifier system. WO 2009/020530 describes a microwave system generator and controller for gas and liquid chromatography. CN103152889 describes a circuit and control method for controlling power of variable-frequency microwave oven. U.S. Pat. No. 4,504,718 describes a microwave heating apparatus with solid state microwave oscillating device. U.S. Pat. No. 3,953,702 describes a solid state microwave oven power source. US 2004/206755 describes a microwave heating using distributed semiconductor sources.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided a radio frequency (RF) heating apparatus. The RF heating apparatus includes a cavity for receiving an object to be heated. The RF heating apparatus comprises a plurality of channels for generating RF radiation to be introduced into the cavity. Each channel includes a frequency synthesiser. Each channel also includes a power amplifier. Each channel further includes an antenna. Each channel is operable to use a common phase reference signal for generating the RF radiation.

By distributing the radiation generating components of an RF heating apparatus in a plurality of channels, each channel having its own frequency synthesiser which uses a common phase reference signal, greater control over the radiation introduced into the cavity of the apparatus may be provided. For example, the components of each channel may be located within the apparatus with a high degree of flexibility. For instance, embodiments of this invention may allow the components of the channels, such as the power amplifiers, to be placed close to each antenna. This is in contrast to conventional devices in which the location of the radiation generating components may be limited by the need to provide long, lossy distribution paths which can also inhibit synchronisation. The common phase reference signal may, in some examples, be distributed using relatively cheap cabling while still allowing for phase distribution between the frequency synthesisers.

In some examples, the channels (e.g. the frequency synthesisers thereof) may be controlled independently. This may allow fine tuning of the RF radiation that is introduced into the cavity.

A radio frequency heating apparatus of the kind described herein may generate RF radiation having a frequency in the range 300 MHz≤f≤30 GHz. The frequency may be determined according to the application. For example, in the field of microwave ovens, operating frequencies are usually chosen to avoid interference with communications devices such as radios and mobile telephones. Consumer ovens usually may use a frequency in the 2.4 GHz to 2.5 GHz range, while large industrial/commercial ovens often use a frequency in the 915 MHz band. Additionally, heating applications are envisaged in the 433 MHz ISM band.

In some examples, each channel may further be provided with a phase shifter and/or a variable gain amplifier.

The apparatus can include an oscillator for generating the common phase reference signal.

The channels may be arranged in different architectures for distribution of the common phase reference signal. The signal generator may be provided in one of the channels. In one example, the channels may be arranged in a daisy chain architecture. In another example, the channels may be arranged in a star architecture. In this example, the signal generator may be located at a central node of the star.

A frequency of the common phase reference signal may be lower than a frequency of the RF radiation generated by the channels. For example, the common phase reference signal may be in the range 1-100 MHz. A low frequency common phase reference signal may be up converted to a higher frequency by each channel for generating the RF radiation. Distribution of a low frequency common phase reference signal may allow relatively cheap cabling to be used, reducing manufacturing costs.

The RF heating apparatus may be provided with control circuitry. The control circuitry may be operable independently to control each of the plurality of channels to vary at least one of a frequency, phase and amplitude of the RF radiation generated by each respective channel. This may allow for close control over the RF radiation introduced into the cavity.

Each channel may be controllably operable to generate RF radiation having different, respective frequency spectra. This may constitute an extra parameter or degree of freedom for controlling the RF radiation introduced into the cavity compared to conventional devices, the antennae of which typically operate at a common frequency. It may also allow detection circuitry, where provided, to use frequency analysis to distinguish between radiation produced by each channel of the apparatus.

In some examples, the RF heating apparatus may include forward and reverse signal detection circuitry. The forward and reverse signal detection circuitry may be operable to determine amplitude, frequency and/or phase information relating to RF radiation in the cavity. The forward and reverse signal detection circuitry may include a plurality of detection circuits, each detection circuit for determining amplitude, frequency and/or phase information for each respective channel. For example, it may allow complex impedance heating process state detection to enable optimisation of the heating process. As another example, S-parameter data can be taken for a heating apparatus cavity.

In some examples, the apparatus may be operable to analyse the information determined by the forward and reverse signal detection circuitry and independently to control each of the plurality of channels adaptively to vary at least one of an amplitude, frequency or phase of the RF radiation generated by each respective channel in response to the analysis. The analysis may include separating out crosstalk components from reflected signal components. This may be achieved by, for a given channel:

identifying signal components at a frequency or frequencies corresponding to an operating frequency spectrum of the channel as reflected signal components of that channel; and identifying signal components at a frequency or frequencies corresponding to an operating frequency spectrum of another channel of the apparatus as crosstalk components.

According to another aspect of the invention, there is provided a microwave oven comprising an RF heating apparatus of the kind described above.

The microwave oven may be a domestic oven or alternatively an industrial oven.

Further applications of an RF heating apparatus according to embodiments of this invention are envisaged in industrial processes or in lighting, medical, industrial heating, automotive, marine or aeronautic propulsion systems.

BRIEF DESCRIPTION OF THE DRAWINGS

Embodiments of the present invention will be described hereinafter, by way of example only, with reference to the accompanying drawings in which like reference signs relate to like elements and in which.

DETAILED DESCRIPTION

Embodiments of the present invention are described in the following with reference to the accompanying drawings.

Embodiments of this invention can provide a radio frequency (RF) heating apparatus in which at least some of the components for generating the RF radiation are distributed into a plurality of separate channels, each channel having its own frequency synthesiser. This separation of the radiation generating components into separate channels can, in some embodiments, allow each channel to be controlled separately (for example, allowing for individual frequency, amplitude and/or phase control). Also, embodiments of this invention provide a radio frequency heating apparatus in which each channel is operable to make use of a common phase reference signal for generating the RF radiation. The common phase reference signal can be used to synchronise the frequency synthesisers of each channel in terms of frequency and/or phase. In some embodiments, the common phase reference signal may be provided at a frequency that is substantially lower than the RF frequency of the radiation that is to be generated. Distribution of the common phase reference signal among the plurality of separate channels does not require the provision of complex, lossy and normally expensive cabling that is usually required for distributing higher frequency RF signals. Accordingly, the cost of an RF heating apparatus according to an embodiment of this invention may be reduced.

Figure 1:
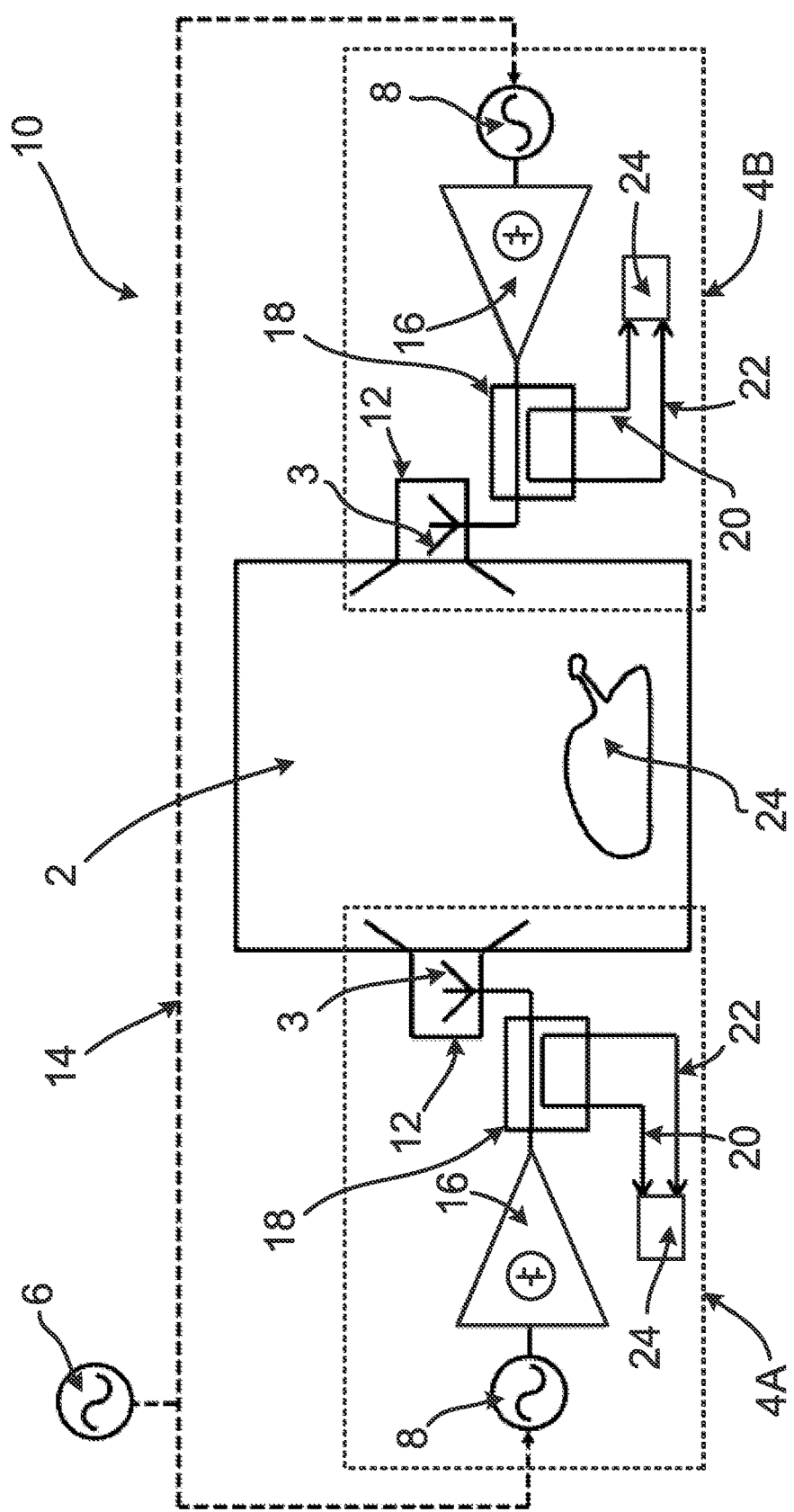
FIG. 1 shows an RF heating apparatus in accordance with an embodiment of the invention.

FIG. 1 illustrates a first example of an RF heating apparatus 10 according to an embodiment of this invention. The apparatus 10 includes a cavity 2 for receiving an object 24 to be heated. In the case of applications such as a microwave oven, the object 24 to be heated may typically comprise a food or beverage. The cavity 2 may be shaped and sized in order to accommodate the object 24. The cavity 2 may be provided with shielding to prevent RF radiation within the cavity 2 from escaping.

The apparatus 10 includes a plurality of channels for generating RF radiation to be introduced into the cavity 2 via a number of ports 12. In the present example, the apparatus 10 includes two channels 4A and 4B, although it is envisaged that more than two channels may be provided.

Each channel 4A, 4B in this embodiment comprises a frequency synthesiser 8. The frequency synthesiser 8 can generate an RF signal at the desired frequency or sequence of frequencies within a range for producing the RF radiation to be introduced by the channel into the cavity 2. Each channel 4A, 4B in this embodiment also includes a power amplifier 16 for amplifying the signal generated by the frequency synthesiser 8. The power amplifier 16 may include one or more separate stages. A variable gain amplifier may also be provided.

Each channel 4A, 4B further includes an antenna 3. Each antenna 3 receives an RF signal from the power amplifier 16 of each respective channel for introducing the RF radiation into the cavity via the ports 12. Each port 12 may be located adjacent the cavity 2. As explained herein, because embodiments of this invention allow more freedom for positioning the components for generating the RF radiation, the ports 12 and antennae 3 may located for optimal generation of radiation within the cavity 2 for a particular application (e.g. cooking). This freedom may not be available in the design of conventional devices because, as explained above, ideal placement of the antennae and other components such as power amplifiers in conventional devices is inhibited by the need to distribute the RF signal within the device.

The frequency synthesiser 8 of each channel 4A, 4B may be operable to generate an RF signal having variable phase, amplitude and/or frequency. In some embodiments, the frequency synthesiser 8 may include an oscillator and a phase locked loop (PLL). In accordance with embodiments of this invention, each frequency synthesiser 8 is operable to use a common phase reference signal for generating the RF radiation, whereby the frequency synthesisers 8 can be synchronised in terms of frequency and/or phase. In this embodiment, the common phase reference signal is provided by an oscillator 6. Cabling 14 may be provided for distributing the common phase reference signal generated by the oscillator 6 to each frequency synthesiser 8. In some embodiments, the oscillator may be incorporated into one of the channels. In other embodiments, the oscillator 6 may be provided separately.

The common phase reference signal may be used by the frequency synthesiser 8 of each channel 4A, 4B as a reference for generating RF radiation having a phase that is known with respect to the phase of RF radiation produced by the frequency synthesiser(s) 8 of the other channel(s). In this way, the operation of each frequency synthesiser 8 of the apparatus 10 in generating RF radiation can be coordinated.

The frequency of the common phase reference signal provided to each frequency synthesiser 8 may be lower than the frequency of the RF radiation that is to be produced by the channels 4A, 4B. In one embodiment, the frequency of the common phase reference signal may be in the range 1-100 MHz. Because the common phase reference signal may have a relatively low frequency, the cabling 14 that may be used for distributing the common phase reference signal to the frequency synthesisers 8 of each channel 4A, 4B may be cheaper than that which would be required in conventional systems in which the signal that is used to generate the RF radiation is disputed at the frequency at which it is to be introduced into the cavity 2. Because the losses and tendency for phase shift at lower frequencies are less onerous, lower tolerance cabling may be used for distributing the common phase reference signal. This can reduce the manufacturing costs of the RF heating apparatus 10.

Where the oscillator 6 is provided separately from each channel 4A, 4B, the oscillator 6 may be incorporated into control circuitry of the apparatus 10 (not shown in FIG. 1). The common phase reference signal may be controllably variable in some embodiments, for example under the control of the control circuitry.

Various different architectures can be used for distributing the common phase reference signal. For example, a daisy-chain architecture may be used. In this example, a first channel of the apparatus 10 either receives the common phase reference signal or itself incorporates the oscillator 6 for generating the common phase reference signal. The frequency synthesiser of that channel can use the common phase reference signal for the generation of RF radiation. The common phase reference signal can then be passed on to a next channel. The frequency synthesiser of the next channel can use the common phase reference signal and the signal can be passed on to a further channel and so on.

In an example of the operation of an apparatus having a daisy chain architecture, for implementing a single frequency operation of the channels requiring phase coherence, the first channel may receive or generate the common phase reference signal at a first frequency and then divide it to lower the frequency of the common phase reference signal before it is passed on to a next channel. For instance a 10 MHz reference may be supplied to a first channel and a synthesiser of the channel may divide this frequency by ten to generate a 1 MHz internal reference frequency. This internal reference frequency may be buffered and then distributed to a second channel, and from there can be used without further division. This approach can ensure that the channels are both phase locked and phase deterministic without requiring a power divider to be used at the RF frequency.

In another example, a star architecture can be used for distributing the common phase reference signal. In such examples, the common phase reference signal can be generated at the central node of the star. For example, a first channel of the apparatus 110 may incorporate an oscillator for generating the common phase reference signal and cabling may then be provided for distributing the common phase reference signal directly to a plurality of other channels of the apparatus 10. In another example, an oscillator may be provided separately from the channels in a central node of the architecture and distributed directly to each of a plurality of channels for generating the RF radiation. The embodiment of FIG. 1 constitutes an example of this star architecture.

Further architectures are envisaged. For example, a hierarchical tree architecture may be used.

The embodiment of FIG. 1 may also include features for monitoring the forward and reverse signal associated with the RF radiation that is introduced into the cavity 2. These features may include a directional coupler 18 which may be connected via a forward signal coupled path 20 and a reverse signal coupled path 22 to forward and reverse signal detection circuitry 24. As will be explained in more detail below, the forward and reversed signal detection circuitry 24 may monitor the RF signal that is introduced into the cavity 2 by the antennae 3 and may also monitor the radiation that is reflected back. Furthermore, in an apparatus 10 that includes multiple antennae 3, at least some of the RF radiation generated by the antenna 3 at a first port may be received at the antenna 3 of a different port. This cross-talk signal, and also the reflected signal, collectively referred to herein as the reverse signal may, along with the forward signal, be monitored and evaluated by the forward and reverse signal detection circuitry 24 of each channel 4A, 4B. In some embodiments, the apparatus 10 is operable to modify the RF radiation that it introduces into the cavity 2. In response to the detection and/or monitoring of the forward and reverse signals by the circuitry 24.

Figure 2:
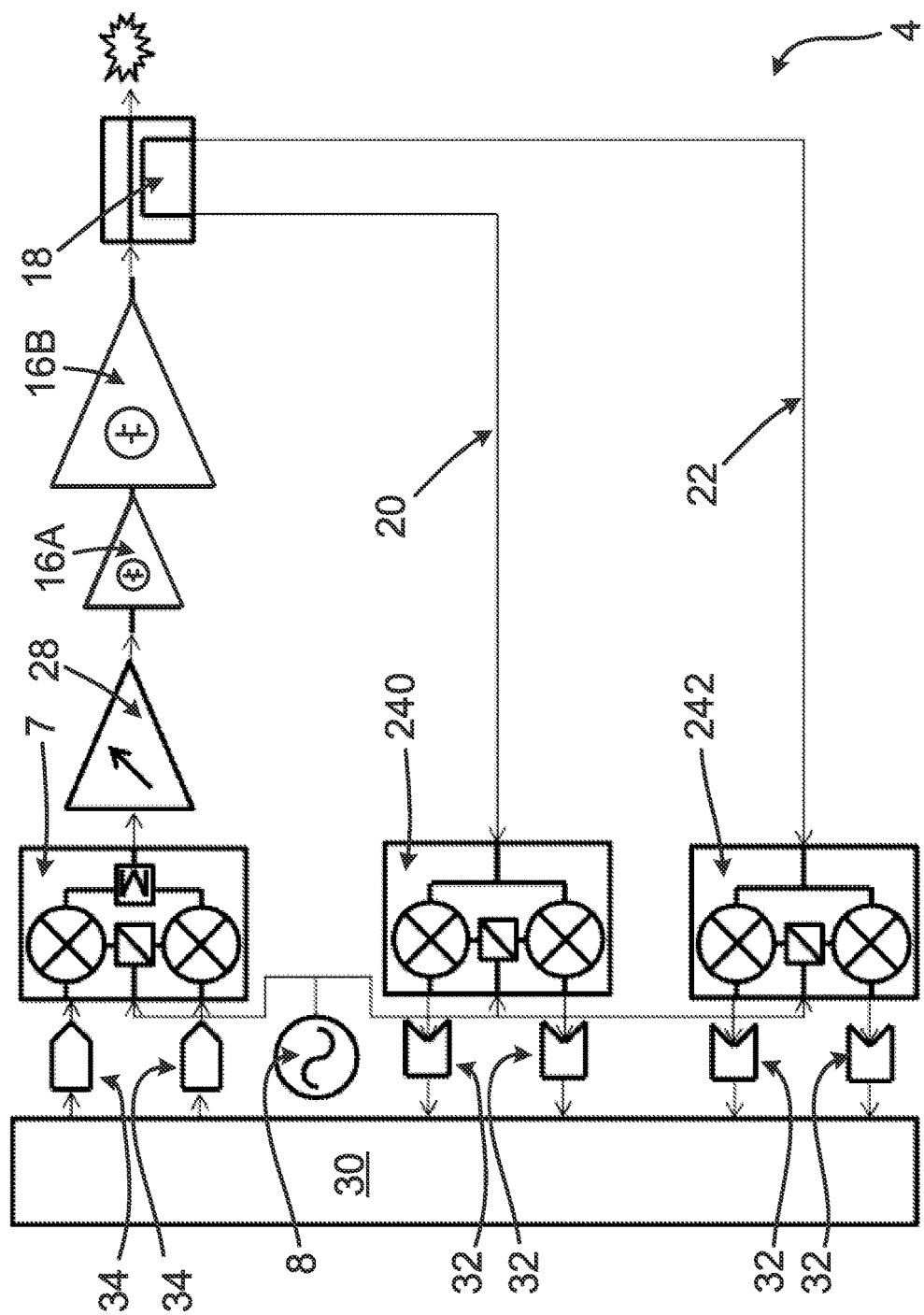
FIG. 2 shows an RF heating apparatus in accordance with another embodiment of the invention.
Figure 3:
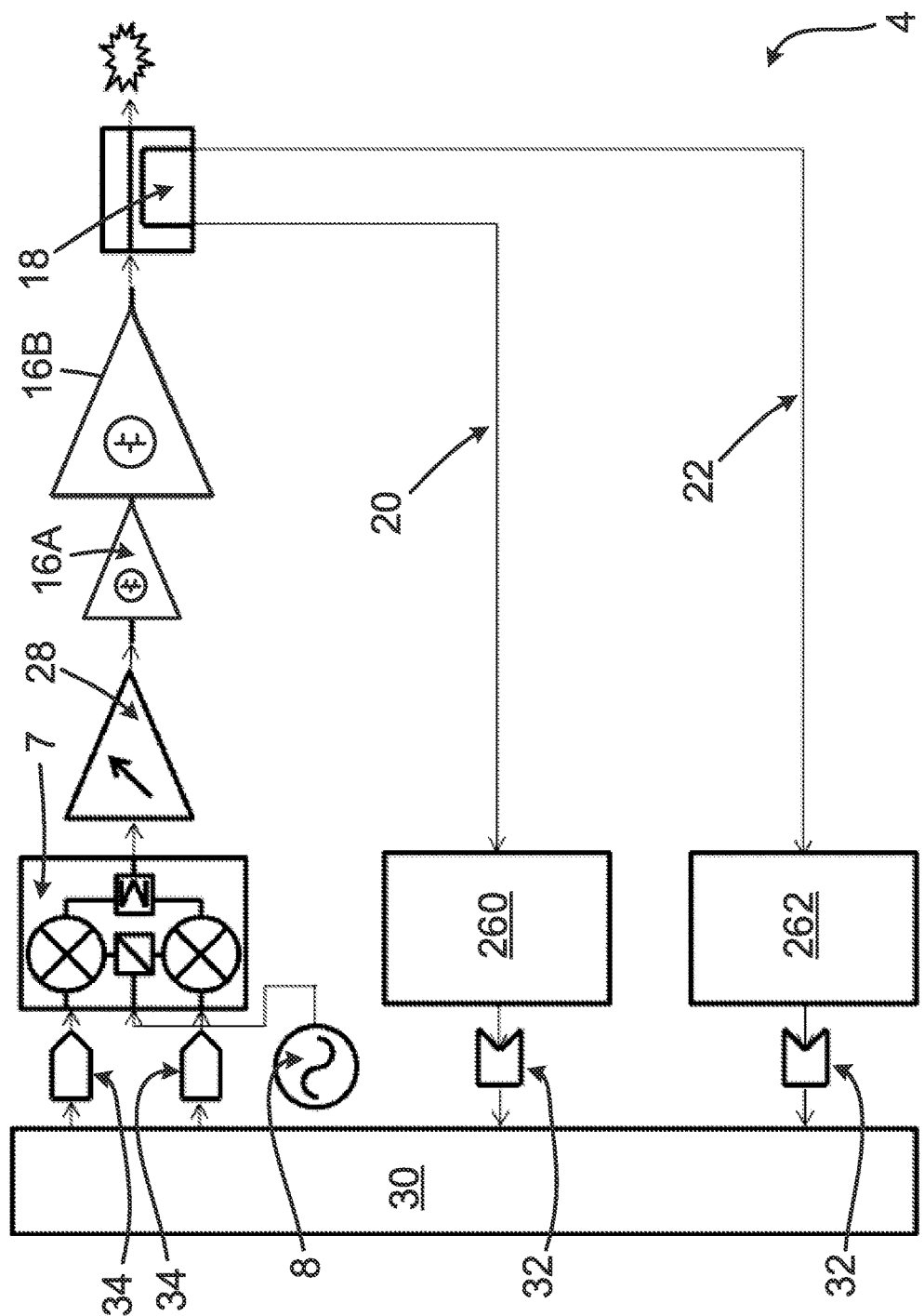
FIG. 3 shows an RF heating apparatus in accordance with a further embodiment of the invention.
Figure 4:
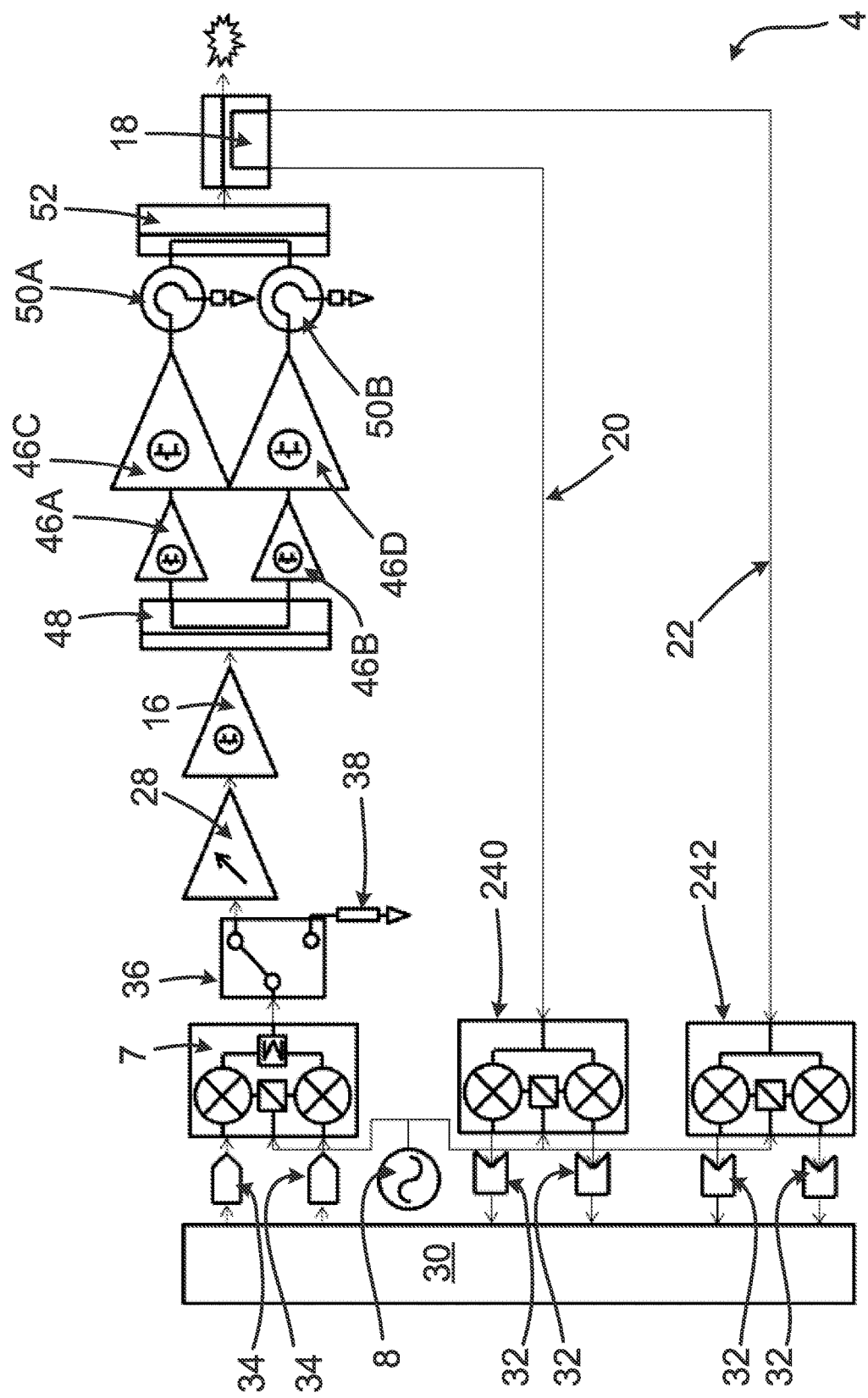
FIG. 4 shows an RF heating apparatus in accordance with another embodiment of the invention.

Each of FIGS. 2-4 illustrate one of the channels 4 of an RF heating apparatus 10 according to an example embodiment of this invention.

In the embodiment of FIG. 2, the channel 4 includes a frequency synthesiser 8. The frequency synthesiser 8 can, as explained above, make use of a common phase reference signal that is received by the channel 4. The frequency synthesiser 8 can provide the signal that it generates to an IQ modulator 7, which can generate a phase modulation for the channel. The IQ modulator 7 may be a coherent quadrature modulator. Additionally, a high power amplifier part is provided (16A, 16B) which can for example use LDMOS or GaN high power transistor devices in various configurations including single ended, push pull transistor packages, or a quadrature or in phase combined arrangement of multiple power transistors. The use of a quadrature combined arrangement in particular (FIG. 4) can allow a higher power to be used per channel 4 of the apparatus while providing additional robustness and maintaining efficiency in the presence of reflected power. The IQ modulator 7 can also receive control signals from a controller 30 via digital to analogue converters (DAC) 34. The use of a quadrature combined arrangement of this kind can allow a high power to be used per channel 4 of the apparatus and can provide additional robustness.

Under control of the signals received from the frequency synthesiser 8 and the controller 30, the IQ modulator 7 can produce an RIP signal which is then passed to a variable gain amplifier 28 and subsequently to the one or more power amplifier stages 16A, 16B. As noted above, power amplifier stages 16A, 16B may comprise LDMOS or GaN power transistors. The use of an IQ modulator 7 arranged as in FIG. 2 may allow a controller 30 to select and adjust the amplitude, phase and frequency of the forward signal, for controlling the RF radiation in the cavity 2.

In an alternative embodiment, instead of using a quadrature modulator and low frequency DAC's such as DACs 34 for the phase modulation, a digital intermediate frequency heterodyne architecture may be used to achieve the same goal, the architecture having a single higher speed DAC, a filter, mixer and optionally an additional filter. In such examples the phase of the forward signal may be controlled directly from the DAC waveform.

From the power amplifier stages 16A, 16B the RF signal may next pass to a directional coupler 18 and subsequently be introduced into the cavity 2 via an antenna (not shown in FIG. 2).

This arrangement can provide for close control of the RF radiation generated by the channel 4. The controller 30 itself may be provided locally at the channel 4 or may be centralised in a common controller responsible for controlling multiple channels. Where the controller is provided locally to each channel 4, the controller may itself receive further control instructions from a centralised controller. In this way, the frequency, phase and amplitude of the RF radiation generated by each channel can be coordinated.

The directional coupler 18 is connected to detection circuitry by a forward signal coupled path 20 and a reverse signal coupled path 22 for monitoring the forward and reverse RF signal. In the example of FIG. 2, the detection circuitry includes a forward signal detection circuit 240 which is connected to the directional coupler 18 by the forward signal coupled path 20 and a separate reverse signal detection circuit 242 that is connected to the directional coupler 18 by the reverse signal couple path 22. The forward signal detection circuit 240 and the reverse signal detection circuit 242 each include an IQ demodulator. Each IQ demodulator may be a coherent quadrature demodulator and may comprise a quadrature combined arrangement of power transistors such as LDMOS or GaN power transistors.

The IQ demodulators may be connected to the frequency synthesiser 8 to allow correct demodulation (e.g. coherent down conversion) of the detected forward and reverse signals to be performed. The output of each IQ demodulator can be provided via analogue to digital converters 32 (ADCs) to the controller 30. The ADCs can digitise the in phase and quadrature signals to represent the complex measurement of the forward and reverse signals. This can provide a complex forward and reverse signal coefficient measurement to controller. The use of IQ demodulators for the forward signal detection circuit 240 and the reverse signal detection circuit 242 can thus allow amplitude, frequency and phase information regarding the forward and reverse signals to be provided to the controller.

As will be explained in more detail, the signals provided to the controller 30 by the forward and reverse signal detection circuitry can be used to monitor the RF radiation introduced and returned from the cavity 2 and the results of this monitoring may be used by the controller 30 to alter the operation of each channel 4 for modifying the RF radiation that is introduced to the cavity 2. In some examples, this monitoring can be performed over time, to observe any changes in the energy coupling within the cavity. These observed changes may inform the controller in its modification of the RF radiation that is introduced to the cavity 2.

Another example of a channel 4 of an RF heating apparatus 10 according to an embodiment of this invention is shown in FIG. 3. The forward signal generating components in this embodiment are the same as those described above in relation to FIG. 2. In this example, however, the forward and reverse signal detection circuitry may include either a logarithmic power detector or an RMS power detector. In particular, a first log or RMS power detector 260 may by connected to the directional coupler 18 via the forward signal coupled path 20 and a second log or RMS power detector 262 may be connected to the directional coupler 18 by the reverse signal coupled path 22. Accordingly, as shown in FIG. 3, the forward and reverse signal detection circuitry may be operable simply to monitor scalar power of the forward and reverse signals and to pass this information on to the controller 30. This simplified arrangement may lower the costs associated with manufacturing the RF heating apparatus 10, where it is not desired that the phase or frequency of the various forward and reverse signals be monitored. The output of each detector 260 and 262 may be provided via analogue to digital converters 32 (ADCs) to the controller 30.

A further embodiment of a channel 4 of an RF heating apparatus 10 according to an embodiment of this invention is shown in FIG. 4. The forward signal generating components shown in FIG. 4 differ from the arrangements described above in relation to FIGS. 2 and 3 as noted below. Although the forward and reverse signal detection circuitry in the embodiment of FIG. 4 is the same as that described above in relation to FIG. 2, it is envisaged that the arrangement of the forward signal generating components shown in FIG. 4 would also be compatible with the use of the scalar power detection circuitry of the kind described in relation to FIG. 3.

In the embodiment of FIG. 4, the output of the IQ modulator 7 is connected to an RF switch 36. The RF switch 36 can act as an isolator switch. In a first position of the switch 36, the output of the IQ modulator 7 is connected to a variable gain amplifier 28 and subsequently to a power amplifier 16. In a second position of the switch 36, the IQ modulator 7 is disconnected from the other forward signal generating components. This can allow the IQ modulator 7, DACs 34 and controller 30 to be isolated from the other forward signal generating components in the event that a large reverse signal is detected by the reverse signal detection circuit 242 and/or controller 30. The RF switch 36 may also be used for blanking of the RF output while the frequency synthesizer 8 is unlocked during frequency hopping, to ensure any emissions out of band are low in power, suitable for meeting EMC requirements.

In this embodiment, the output of the power amplifier 16 is be connected to a directional coupler 48 which may provide signals to further power amplifier stages 46A, 46B, 46C, 46D. The outputs of these power amplifiers may be provided to circulators 50A, 50B and from there to a further power quadrature combiner 52 (which may be a high power quadrature combiner). This arrangement can enable high power channels above the power level of a single power device. Similarly, non-quadrature combiners (e.g. 'y' combiners may be used). The RF signal may then pass via the directional coupler 18 to an antenna (not shown) for subsequent introduction into the cavity 2 of the apparatus 10. The arrangement of the circulators 50A, 50B can be used to protect the amplifiers 46A, 46B, 46C, 46D as described in U.S. Pat. No. 3,953,702.

It will be apparent to those familiar with the field that the small signal blocks shown in all the embodiments (for example the ADCs 32, DACs 34, IQ modulator 7, variable gain amplifier 28, and detection circuitry 240 and 242 shown in FIG. 2 and the corresponding parts in FIGS. 3 & 4) may be integrated into a flexible and low cost RF integrated circuit while not necessarily making any fundamental change to the architectures proposed and discussed herein.

The directional coupler 18 allows connection of the detection circuitry 240 and 242 for forward/reserve signal detection as explained previously.

As explained above in relation to, for example, FIGS. 2 and 4, in some embodiments forward and reverse signal detection circuitry may be operable to detect amplitude, phase and frequency information in respect of the forward and reverse RF signals. For example, the circuitry can include IQ demodulators. Accordingly, in some examples, the amplitude, phase and frequency of the RF radiation in the cavity 2 can be monitored. In this way, it is possible to monitor and adapt the amplitude, frequency and/or phase of the RF radiation within the cavity 2 in response to the results of the monitoring. This may be useful in adaptably controlling the RF radiation present within the cavity 2 during, for example, the cooking of a food or beverage or heating of an industrial material or process. Prior techniques for monitoring forward and reverse power detection have used logarithmic amplifiers to detect the power of the forward and reverse signal. However, amplifiers of this kind usually fail to provide a true power reading, particularly where the RF radiation in the cavity 2 contains multiple different frequencies. Moreover, conventional monitoring techniques for forward and reverse power detection are unable to distinguish between the RF radiation that is introduced into the cavity by different antennae. It may therefore be difficult or impossible to assess factors such as the true return loss for one signal at one port from one source.

By detecting amplitude, frequency and/or phase information of the forward and reverse signal for each channel 4, additional information for determining the conditions within the cavity 2 of the RF heating apparatus is thus provided. In principle, the additional information can be employed to provide a feedback mechanism for close control of the RF radiation within the cavity. Accordingly, in some examples and as explained above, the apparatus 10 can alter the parameters (amplitude, frequency, phase) of the RF radiation that each channel 4 introduces into the cavity 2 based on the information gathered by the forward and reverse signal detection circuitry. Because each channel 4 comprises its own frequency synthesiser 8, this adjustment of the RF radiation that is introduced into the cavity can be performed on a channel-by-channel basis.

As noted above, the reverse signal may include components relating to RF radiation that is reflected back from the forward signal of a given channel, and may further include components relating to RF radiation that was introduced into the cavity 2 by a different channel. In some embodiments, each channel can be operated at a different frequency spectrum, whereby the radiation associated with the reverse signal can be separated out into its various components on a channel-by-channel basis using frequency analysis. This frequency analysis may be implemented using, for example, fast Fourier transform techniques.

Separation of the contributions to the reverse signal associated with radiation produced by multiple channels at different frequencies can also be used to manage intermodulation between the frequencies of the RF radiation produced by each respective channel. Intermodulation of the RF radiation within the cavity can lead to interference signals that can fall outside the frequencies allocated for the operation of the RF heating apparatus. Frequency analysis may be used to provide closer control over these intermodulation effects by close monitoring and tuning of the RF radiation produced and received at each channel.

Figure 5:
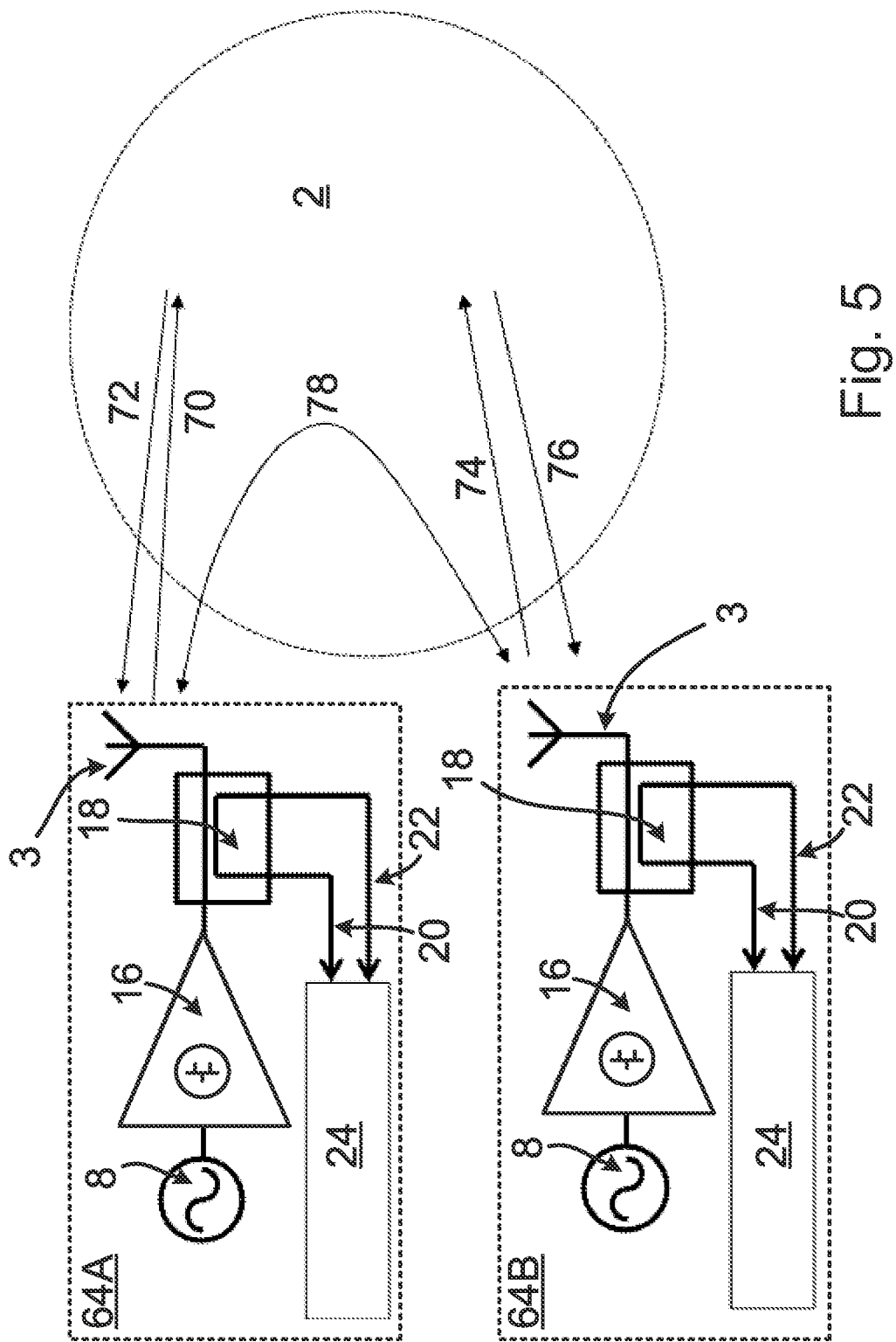
FIG. 5 illustrates the production and detection of forward, reverse and crosstalk signals in a cavity of an RF heating apparatus in accordance with an embodiment of the invention.

FIG. 5 illustrates the production and detection of forward and reverse signals associated with RF radiation in a cavity 2 of an RF heating apparatus 10 in accordance with an embodiment of this invention. In this example, the apparatus 10 includes two channels 64A and 64B. Each channel 64A and 64B may be a channel of the kind described above. It will be appreciated that further channels may be included.

In FIG. 5, a first channel 64A introduces RF radiation 70 into the cavity 2. A second channel 64B introduces RF radiation 74 into the cavity 2. Some of the RF radiation 70 introduced into the cavity 2 by channel 64A is reflected back to the channel 64A. This reflected radiation 72 may be detected by the detection circuitry 24 of the channel 64A. Similarly, some of the radiation 74 introduced into the cavity 2 by the channel 64B will be reflected back to the channel 64B. This reflected radiation 76 may be detected by the circuitry 24 of the channel 64B. In FIG. 5, the arrow labelled 78 schematically shows cross-talk between the two channels 64A, 64B. The cross-talk 78 is associated with some of the radiation 72 introduced to the cavity 2 by channel 64A being received (either directly or by reflection within the cavity 2) at channel 64B, and with some of the radiation 74 introduced to the cavity 2 by channel 64B being received at channel 64A (again, either directly or following reflection within the cavity 2). At each channel 64A and 64B, the reverse signal detected by detection circuitry 24 will thus include a reflected component (corresponding to radiation generated by that channel) and a cross-talk component (corresponding to radiation generated by another channel). In some cases, the reverse signal may further include an intermodulation component.

Figure 6:
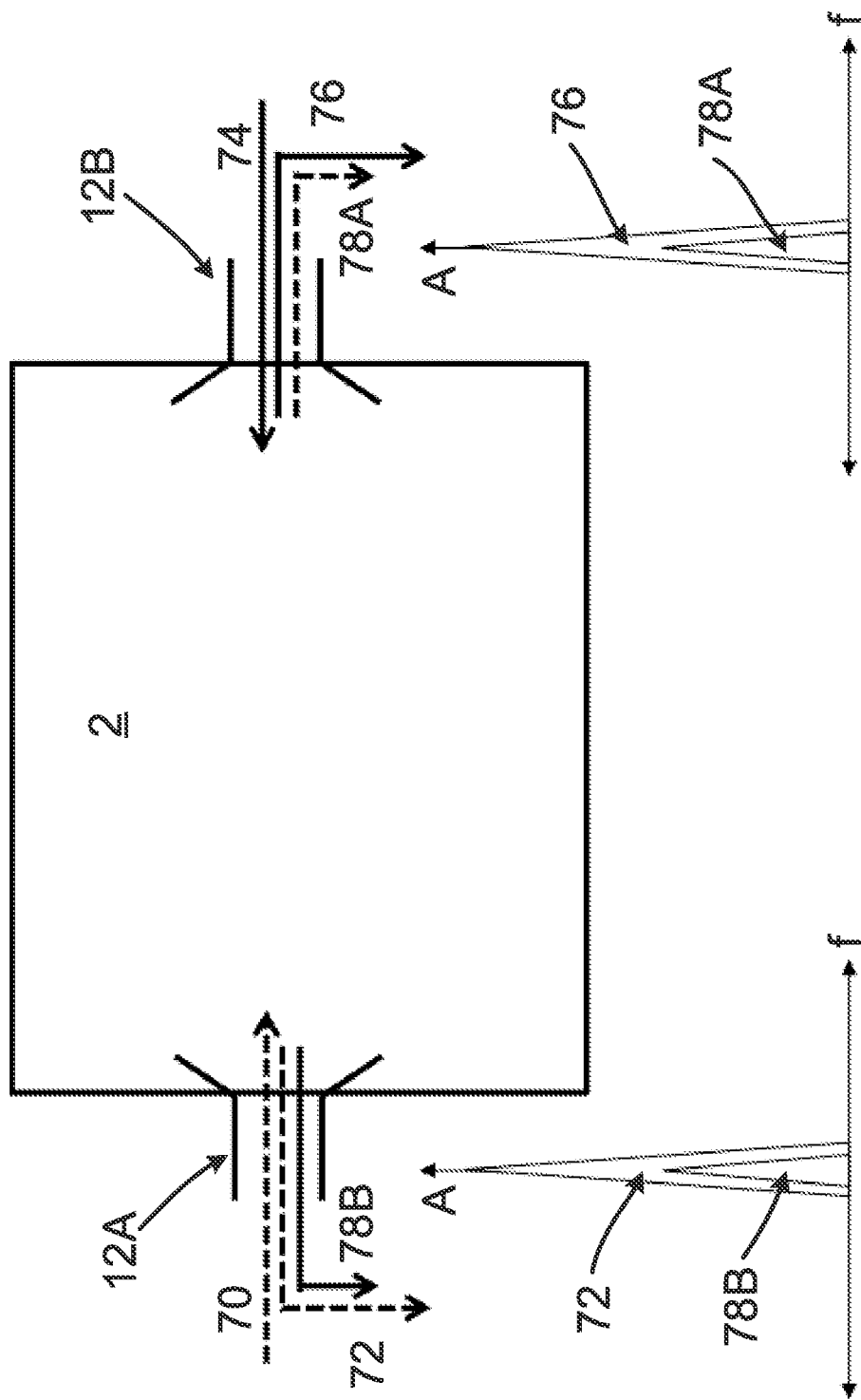
FIG. 6 shows the detection of RF signals in an RF heating apparatus.

FIG. 6 schematically illustrates that it is conventionally not possible to distinguish between the reflected radiation 72 or 76 and radiation associated with cross-talk 78 in the reverse signal that is detected by each channel. Because of this, it is difficult, if not impossible, to separate cross-talk components from the reverse signal, whereby assessment of the true state of RF radiation within the cavity is inhibited. In FIG. 6, port 12A outputs radiation 70 and receives a reflected signal 72. Port 12B outputs radiation 74 and receives reflected radiation 76. Each channel in this example operates at the same frequency.

Port 12A also receives a cross-talk component 78B associated with radiation introduced into the cavity 2 via port 12B. Similarly port 12B further receives a cross-talk component 78A, associated with radiation introduced into the cavity 2 via port 12A. Where only magnitude information is detected (for example, using conventional logarithmic amplifiers), it is not possible to distinguish between the components 72 and 78B received at port 12A or between components 76 and 78A received at port 12B. Even where frequency analysis of the radiation is possible, it would still not generally be possible to distinguish between these components. This is shown in the amplitude versus frequency graphs of FIG. 6 for each of the two ports 12A and 12B. As shown for port 12A, the component 78B generally occupies the same frequency as the reflected component 72 and as shown for port 12B, the cross-talk component 78A occupies the same frequency as the reflected component 76.

In accordance with an embodiment of this invention, by operating the channels at different frequencies, and by performing a frequency analysis of the reverse signal (e.g. using fast Fourier transforms or other techniques) it may be possible to distinguish between reflected components and cross-talk. This is schematically illustrated in FIG. 7.

Figure 7:
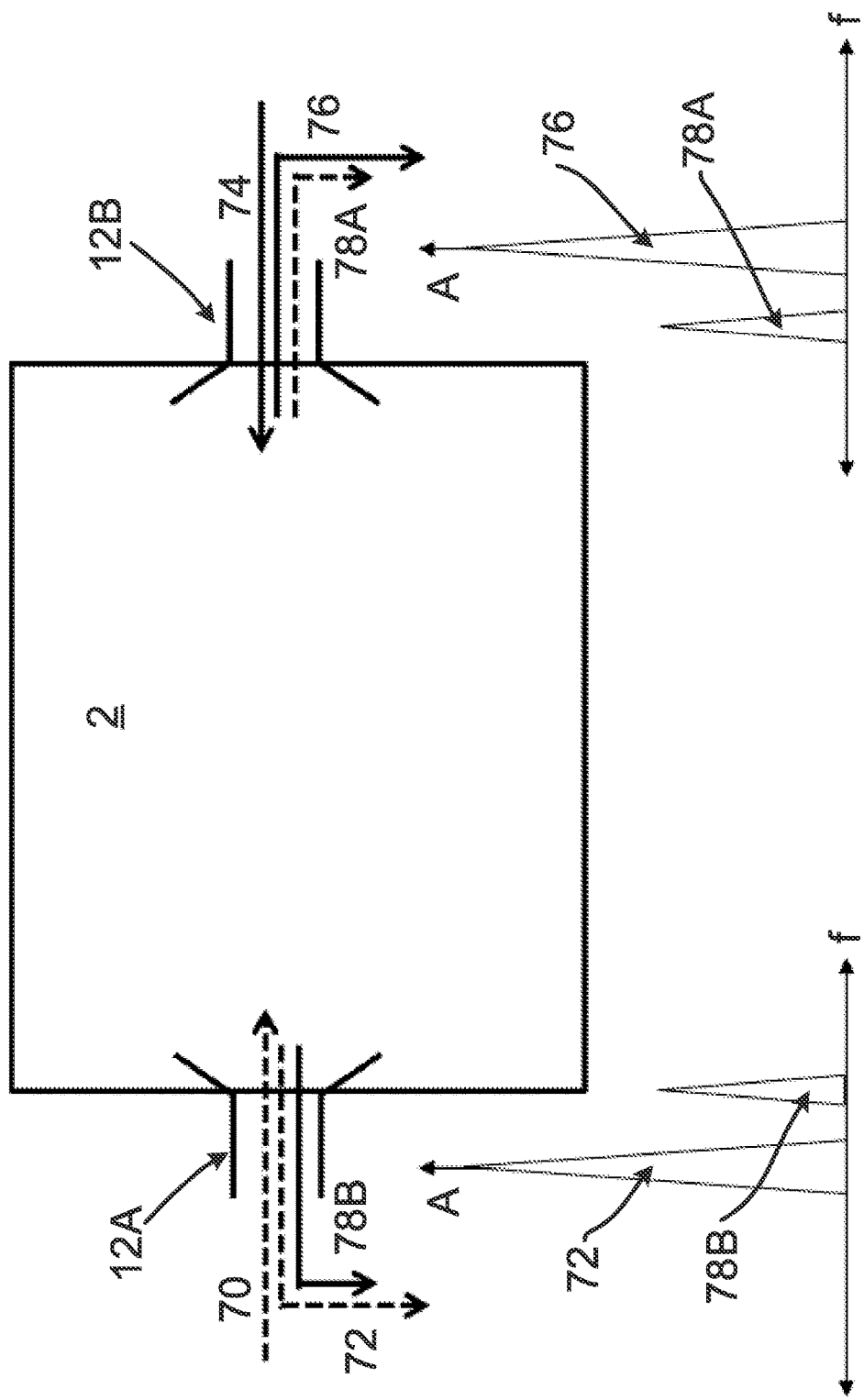
FIG. 7 shows the frequency analysis of reverse and crosstalk signals in an RF heating apparatus in accordance with an embodiment of the invention.

In FIG. 7, the channel associated with port 12A introduces radiation into the cavity 2 at a first frequency and the channel associated with port 129 introduces radiation into the cavity 2 at a second, different frequency. Frequency analysis of the radiation received back at port 12A in this case can distinguish between the reflected signal 72 and the cross-talk component 78B, since these would occupy different regions in the frequency spectrum. Similarly, at port 12B, the reflected component 76 may be distinguished from the cross-talk component 78A since these would again occupy different frequencies.

Frequency analysis of the reverse signal in this manner may be implemented using a reverse signal detection circuit of the kind described in relation to FIGS. 2 and 4. As described above, this kind of circuitry may be operable to determine the amplitude, frequency and phase of the reverse signal.

In this way, frequency analysis can be used separately to monitor, measure and evaluate the radiation introduced into the cavity 2 and received back at each port associated with a channel of the RF heating apparatus 10. As noted above, this can allow closer control of the RF radiation present within the cavity. For example, it can be used to manage the intermodulation problem noted above. It may also allow cavity power retention behaviour within the cavity 2 to be optimised, which may produce an optimised RF field for cooking a given type of food or beverage.

Accordingly, there has been described a radio frequency (RF) heating apparatus and a microwave oven comprising an RF heating apparatus. The apparatus includes a cavity for receiving an object to be heated. The apparatus also includes a plurality of channels for generating RF radiation to be introduced into the cavity. Each channel includes a frequency synthesiser, a power amplifier and an antenna. Each channel is operable to use a common phase reference signal for generating the RF radiation. Each channel may be controllably operable to generate RF radiation having different, respective frequency spectra. Forward and reverse signal detection circuitry may be provided that is operable to determine amplitude, frequency and/or phase information relating to RF radiation in the cavity. This information may be used for adaptively controlling the RF radiation generated by each channel.

Although particular embodiments of the invention have been described, it will be appreciated that many modifications/additions and/or substitutions may be made within the scope of the claimed invention.

The invention claimed is:
1. An radio frequency (RF) heating apparatus comprising:
a cavity for receiving an object to be heated;
an oscillator for generating a common phase reference signal;
a plurality of channels for generating RF radiation to be introduced into the cavity, wherein each channel comprises:
an RF frequency synthesiser;
a coherent quadrature modulator for modulating a first RF signal outputted by the RF frequency synthesiser;
a controller for outputting control signals to the modulator for controlling at least one of phase and amplitude of the modulated first RF signal;
a power amplifier for amplifying the modulated first RF signal;
an antenna connected to an output of the power amplifier;
a forward signal detection coherent quadrature demodulator;
a reverse signal detection coherent quadrature demodulator; and
a directional coupler connected in between the power amplifier and the antenna, the directional coupler being connected to the forward signal detection coherent quadrature demodulator and to the reverse signal detection coherent quadrature demodulator by a forward signal coupled path and a reverse signal coupled path, respectively,
wherein the forward signal detection coherent quadrature demodulator is configured to monitor an RF signal that is introduced in the cavity by the antenna and wherein the reverse signal detection coherent quadrature demodulator is configured to monitor an RF signal that is reflected back from the cavity,
wherein the forward signal detection and the reverse signal detection coherent quadrature demodulators are configured to provide their respective output to the controller,
wherein the controller is configured to use the output from the forward signal detection and the reverse signal detection coherent quadrature demodulators to alter operation of the channel for modifying the RF radiation that is introduced to the cavity, and wherein the common phase reference signal is used to synchronise the frequency synthesisers of each channel in terms of at least one of frequency and phase.

2. The RF heating apparatus of claim 1, wherein the channels are arranged in a daisy chain architecture for distribution of the common phase reference signal.

3. The RF heating apparatus of claim 1, wherein the channels are arranged in a star architecture for distribution of the common phase reference signal, wherein the oscillator is located at a central node of the star.

4. The RF heating apparatus of claim 1, wherein the oscillator is comprised in one of the channels.

5. The RF heating apparatus of claim 1, wherein a first frequency of the common phase reference signal is lower than a second frequency of the RF radiation generated by the channels.

6. The RF heating apparatus of claim 5, wherein the first frequency of the common phase reference signal is in a range of 1-100 MHz.

7. The RF heating apparatus of claim 1, wherein each channel is controllably operable to generate RF radiation having different, respective frequency spectra.

8. The RF heating apparatus of claim 1, wherein the apparatus is operable to analyse information determined by the forward signal detection and the reverse signal detection coherent quadrature demodulators and independently to control each of said plurality of channels adaptively to vary at least one of an amplitude, frequency, or phase of the RF radiation generated by each respective channel in response to said analysis.

9. The RF heating apparatus of claim 8, wherein said analysis comprises separating out crosstalk components from reflected signal components.

10. The RF heating apparatus of claim 9, wherein said separating out crosstalk components from reflected signal components comprises, for a given channel:
    identifying signal components at a first frequency or frequencies corresponding to a first operating frequency spectrum of the given channel as reflected signal components of the given channel; and
    identifying signal components at a second frequency or frequencies corresponding to a second operating frequency spectrum of another channel of the apparatus as crosstalk components.

11. A microwave oven comprising the RF heating apparatus of claim 1.

* * * * *